(12) United States Patent
Dechu et al.

(10) Patent No.: US 10,810,897 B2
(45) Date of Patent: Oct. 20, 2020

(54) QUESTION GENERATION FOR LEARNING SESSION

(71) Applicant: International Business Machines Corporation, Armonk, NY (US)

(72) Inventors: Sampath Dechu, Hyderabad (IN); Neelamadhav Gantayat, Bangalore (IN); Shreya Khare, Bangalore (IN); Senthil Kumar Kumarasamy Mani, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 411 days.

(21) Appl. No.: 15/840,886

(22) Filed: Dec. 13, 2017

(65) Prior Publication Data

US 2019/0180639 A1 Jun. 13, 2019

(51) Int. Cl.
*G09B 7/00* (2006.01)
*G06N 5/02* (2006.01)
*G06F 40/30* (2020.01)

(52) U.S. Cl.
CPC ............. *G09B 7/00* (2013.01); *G06F 40/30* (2020.01); *G06N 5/022* (2013.01)

(58) Field of Classification Search
CPC .... G09B 5/00; G09B 5/02; G09B 7/00; G06F 40/169
See application file for complete search history.

(56) References Cited

U.S. PATENT DOCUMENTS

| 8,682,241 | B2 | 3/2014 | Huerta | |
|---|---|---|---|---|
| 9,028,260 | B2 | 5/2015 | Nanjiani et al. | |
| 2009/0055746 | A1* | 2/2009 | Dimitrova | G06F 16/434 715/731 |
| 2010/0081120 | A1* | 4/2010 | Nanjiani | G09B 7/02 434/322 |
| 2010/0279267 | A1* | 11/2010 | Swanson | G09B 7/00 434/362 |
| 2014/0280307 | A1 | 9/2014 | Gupta et al. | |
| 2015/0088888 | A1* | 3/2015 | Brennan | G06F 16/38 707/737 |
| 2017/0091312 | A1 | 3/2017 | Ajmera et al. | |

* cited by examiner

*Primary Examiner* — Peter R Egloff
(74) *Attorney, Agent, or Firm* — Ference & Associates LLC (57) ABSTRACT

One embodiment provides a method, including: receiving input of a learning session that is being conducted by an educator, being provided to at least one user, and being related to a subject; determining, using a knowledge base, that at least one topic relevant to the subject of the learning session is incomplete, wherein the determining comprises building a knowledge subgraph of the learning session and comparing the built knowledge subgraph to at least a portion of the knowledge base; generating at least one question to be asked of the educator relevant to the at least one incomplete topic; identifying, using at least one natural language text classifier model, a location within the learning session to ask the generated at least one question; and providing, to the educator, an output corresponding to the at least one question at the identified location within the learning session.

20 Claims, 2 Drawing Sheets

FIG. 2

QUESTION GENERATION FOR LEARNING SESSION

BACKGROUND

To learn new things, people may access different resources for learning about the desired topic or subject. As an example, a person may access an Internet site and provide a query that may return one or more text-based or static image documents that provide written words or pictures that explain or describe the desired subject. As another example, a user may access one or more videos that illustrate a particular process or application. Alternatively, a user may access or participate in a knowledge sharing session that includes one or more users that present information on a particular topic. A knowledge sharing session may include a recorded session that is accessible later, for example, a video that includes the demonstrator or educator presenting the topic. Alternatively, the knowledge sharing session may be a live session (e.g., in person session, web-based session, etc.) where a user listens and interacts with the presenter while the presenter is presenting the topic.

BRIEF SUMMARY

In summary, one aspect of the invention provides a method, comprising: utilizing at least one processor to execute computer code that performs the steps of: receiving input of a learning session that is being conducted by an educator, the learning session being provided to at least one user and being related to a subject; determining, using a knowledge base, that at least one topic relevant to the subject of the learning session is incomplete, wherein the determining comprises building a knowledge subgraph of the learning session and comparing the built knowledge subgraph to at least a portion of the knowledge base; generating at least one question to be asked of the educator relevant to the at least one incomplete topic; identifying, using at least one natural language text classifier model, a location within the learning session to ask the generated at least one question; and providing, to the educator, an output corresponding to the at least one question at the identified location within the learning session.

Another aspect of the invention provides an apparatus, comprising: at least one processor; and a computer readable storage medium having computer readable program code embodied therewith and executable by the at least one processor, the computer readable program code comprising: computer readable program code configured to receive input of a learning session that is being conducted by an educator, the learning session being provided to at least one user and being related to a subject; computer readable program code configured to determine, using a knowledge base, that at least one topic relevant to the subject of the learning session is incomplete, wherein the determining comprises building a knowledge subgraph of the learning session and comparing the built knowledge subgraph to at least a portion of the knowledge base; computer readable program code configured to generate at least one question to be asked of the educator relevant to the at least one incomplete topic; computer readable program code configured to identify, using at least one natural language text classifier model, a location within the learning session to ask the generated at least one question; and computer readable program code configured to provide, to the educator, an output corresponding to the at least one question at the identified location within the learning session.

An additional aspect of the invention provides a computer program product, comprising: a computer readable storage medium having computer readable program code embodied therewith, the computer readable program code executable by a processor and comprising: computer readable program code configured to receive input of a learning session that is being conducted by an educator, the learning session being provided to at least one user and being related to a subject; computer readable program code configured to determine, using a knowledge base, that at least one topic relevant to the subject of the learning session is incomplete, wherein the determining comprises building a knowledge subgraph of the learning session and comparing the built knowledge subgraph to at least a portion of the knowledge base; computer readable program code configured to generate at least one question to be asked of the educator relevant to the at least one incomplete topic; computer readable program code configured to identify, using at least one natural language text classifier model, a location within the learning session to ask the generated at least one question; and computer readable program code configured to provide, to the educator, an output corresponding to the at least one question at the identified location within the learning session.

A further aspect of the invention provides a method, comprising: utilizing at least one processor to execute computer code that performs the steps of: receiving input of a training session being presented by at least one demonstrator, wherein the training session comprises a session for training at least one user regarding a topic; identifying, within the training session, at least one skip-over sub-topic, wherein the at least one skip-over sub-topic comprises a sub-topic presented within the training session that is incomplete; generating, using a knowledge base related to the topic, a plurality of questions relevant to the skip-over sub-topic and prioritizing the plurality of questions based upon information provided in the training session; detecting a suitable location within the training session to ask at least one of the plurality of questions; and providing output of the at least one of the plurality of questions at the detected location.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

Knowledge sharing sessions may be used to teach information regarding a particular process, a particular application, a transition to a new phase, or the like. Accordingly, the presenter conducting the knowledge sharing session is typically an expert, or at least very knowledgeable, on the particular subject and is thus able to provide large volumes of information regarding the subject and answer any questions that a participant may have. However, these knowledge sharing sessions are generally restricted to a certain time duration. Accordingly, the presenter creates the knowledge sharing session presentation with the time duration in mind and may merely introduce a sub-topic relating to the subject matter or may not even mention a sub-topic at all. Depending on the base knowledge level of the participants, this approach may create problems for participants in fully understanding the subject matter. It may also create confusion for the participants when discussing more detailed aspects of the subject matter, because the participants do not understand the basics of the subject matter.

Conventional techniques for addressing these problems include providing a questionnaire to participants before participating in the knowledge sharing session to identify an average understanding of the participants with regard to the subject matter. The presenter can then tailor the knowledge sharing session to the average knowledge level of the participants. One problem with this approach is that not all participants may have the same base knowledge, thereby causing problems for the presenter when trying to tailor the session to provide enough base knowledge to those less knowledgeable, while still maintaining a level of sophistication such that the participants having more advanced knowledge still benefit from the session. Another problem with this approach is that the presenter may not have enough allotted time to provide not only the base information, but also provide the desired information that is the actual topic of the session.

Another conventional approach is to assign the knowledge sharing session a knowledge or familiarity level, for example, beginner, intermediate, advanced, and the like. This level identifies how familiar the participant should be with the base subject before participating in the knowledge sharing session. One problem with this approach is that a participant may think he/she has one level of familiarity with the subject matter and then when participating in the session, identify that the level of familiarity he/she thought he/she has was not the level of familiarity expected. For example, a participant may think he/she has beginning knowledge of the subject and when participating in the session may determine that he/she is already familiar with all the covered topics and should have taken an intermediate session instead. As another example, a participant may think he/she has advanced knowledge of the subject and when participating in the session may determine that he/she is not familiar with concepts that are only briefly mentioned. Additionally, some sessions may require that particular information be conveyed, regardless of the knowledge level of the participant.

Another approach is to allow participants to ask questions during the presentation. The presenter can then answer the questions during the session. One problem with this approach is that some participants may ask questions that are not germane or only tangentially related to the intended subject matter, thereby resulting in the presenter moving off topic with relation to the intended subject. This may frustrate other participants in the session. Alternatively, the presenter may allow questions to be asked at the end of the presentation, which may be unhelpful to a participant who failed to understand most of the presentation because the question was not answered at the beginning of the session. In the case of a presentation that was previously recorded and then accessed by participants at a later time, questions may be provided in a comment or question section of the website associated with the presentation. While the presenter may not answer the questions, other participants may be able to answer the question and the questions and answers will be accessible to any subsequent participants. However, since the presenter did not answer the question, the answer may be wrong. Additionally, this approach is not feasible during a live session.

Accordingly, the techniques and systems as described herein provide a technique for identifying an incomplete topic related to a knowledge sharing session, generating a question relevant to the topic, and presenting the question to the presenter during the presentation of the knowledge sharing session. The terms knowledge session, knowledge sharing session, learning session, and session will be used here throughout interchangeably. These terms refer to a session having a presenter, educator, or demonstrator who is providing information regarding a particular topic or subject to one or more other users.

The system may receive input of a learning session that is being conducted by the educator. The learning session may include both sessions that are presented at one time, recorded, and accessed by a participant or user at a later time, or a live session where the participant is participating in the session at the same time that the educator is presenting the session. While the session is being conducted, the system may determine that at least one topic relevant to the subject of the session is incomplete, either because the educator never mentioned the topic or because the educator discussed the topic but may have missed discussing a particular facet of the topic. In determining that at least one topic is incomplete, the system may build a knowledge subgraph of the learning session as the session is being conducted. The knowledge subgraph may then be compared to a curated knowledge base. This comparison may assist in identifying an incomplete topic.

The system may then generate at least one question that is relevant to the incomplete topic to be asked of the educator. Before presenting the question to the educator, the system may identify a location within the leaning session to ask the question. In other words, rather than interrupting the presenter in the middle of a topic or sentence, the system may identify a break or pause in the session that may be an appropriate location to present the question. Once the location is identified, the system may provide output relating to the question at the identified location.

Such a system provides a technical improvement over current techniques for knowledge sharing sessions. The systems and methods as described herein provide a mechanism for identifying incomplete topics within a presentation and generating questions relevant to the topic. The system then presents these questions to the presenter of the session as the session is being conducted. Thus, this system provides a mechanism that is able to assist participants in understanding a topic without impeding the session with unnecessary information or questions that are not germane to the subject of the session. Additionally, the systems as described herein allow a presenter to conduct a session without requiring that the presenter tailor the session to each individual group that may be participating in the session. Rather, the system generates questions that may be necessary for understanding by all participants in the session.

Figure 1:
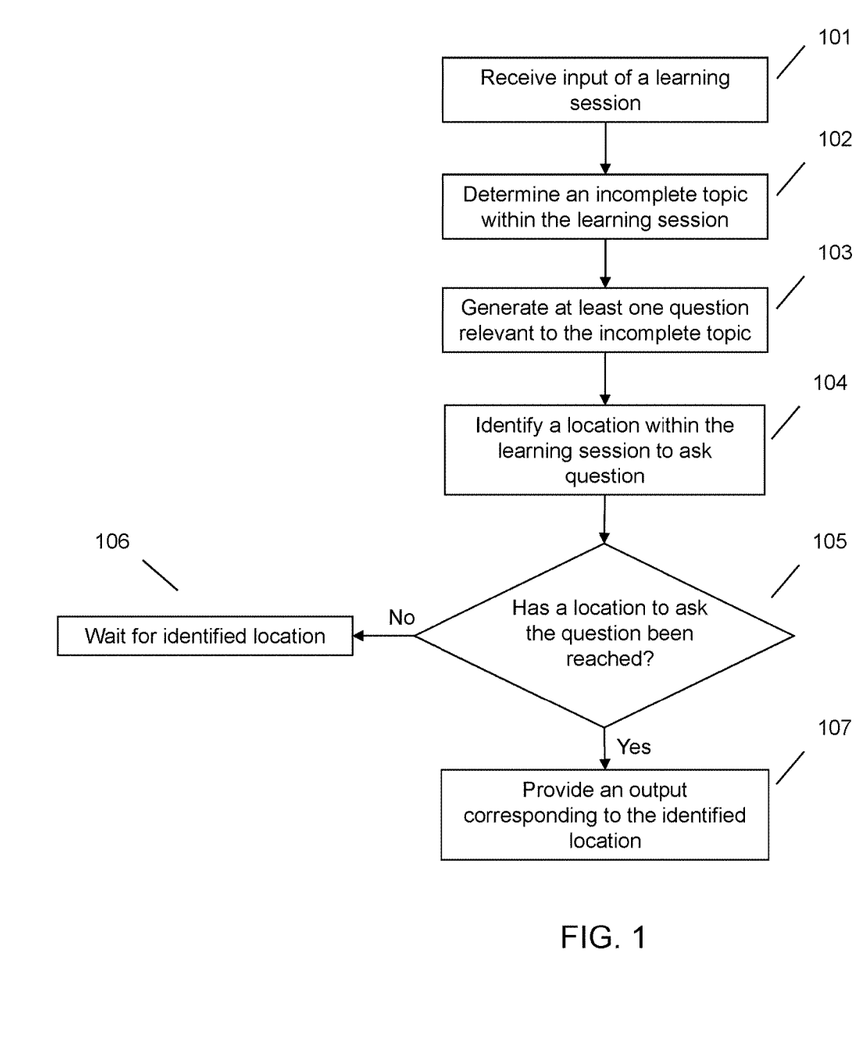
FIG. 1 illustrates a method of generating questions related to a learning session and asking the generated questions at an appropriate location within the learning session.

FIG. 1 illustrates a method for generating questions related to incomplete topics of a learning session and presenting the generated questions to a presenter. At 101 the system receives input of a learning session that is being conducted by an educator or other presenter. The input may include a presenter notifying the system that a learning session is beginning or ongoing, for example, by the presenter activating the system, or may include receiving other input that a learning session may be starting, for example, by accessing contextual or environmental information that may indicate a learning session is beginning. Contextual or environmental information may include calendar entries, room schedules, biometric information (e.g., heat signatures of multiple people, voice signatures of multiple people, etc.), activation of a particular application (e.g., a web conferencing application, a presentation application, etc.), or the like.

A learning session may include both sessions that are presented at one time, recorded, and accessed by a participant or user at a later time, or a live session where the participant is participating in the session at the same time that the educator is presenting the session. A live session may include a session where both the presenter and the participant(s) are in the same physical location. Alternatively, a live session may include a session where the presenter and one or more participants are physically located in different locations and are engaging in the session using a network or Internet based application (e.g., video conference application, webcast, etc.). The learning session may be related to a particular topic or subject of interest to the participants, or may be related to a topic or subject that the participant is required to learn, for example, as part of the job of the participant, due to a mandatory transition from one product to another, or the like.

At 102 the system or cognitive agent may determine that at least one topic relevant to the subject of the learning session is incomplete. An incomplete topic may be a topic that is not even mentioned by the presenter during the presentation of the session. Alternatively, an incomplete topic may be a topic that is discussed but is missing one or more facets. In other words, the incomplete topic may be a topic that is not fully addressed during the session by the presenter. These incomplete topics are also referred to as "skip-over" topics. Determining or identifying an incomplete topic may include first identifying the subject of the session and identifying topics that will be or have been addressed during the session. Identifying the subject of the session and the topics may include accessing a schedule or agenda associated with the session. The system can then parse the schedule or agenda to identify the subject and topics of the subject. Alternatively, or in combination, the presenter may provide information to the system identifying the subject and/or topics.

Determining or identifying a skip-over topic may include identifying both a current topic of the session and previously presented topics of the session. Thus, the system may capture both audio and video or images of the session. The system may convert the audio to text using automatic speech recognition and then parse the text to identify words and topics in the audio. In the case that video and/or images are presented and/or accessible, for example, a presentation, a video of the session, or the like, the system may use a frame differencing technique to extract frames from the video and/or images. The cognitive agent may then use topic modeling on the identified topics to identify topics that are related to a previously presented or current topic of the session.

Identifying an incomplete topic may also be performed using a knowledge subgraph of the learning session. The knowledge subgraph of the learning session is built as the session is presented, thereby representing an instance of the session. The knowledge subgraph is continually updated as the session progresses. In other words, the knowledge subgraph is built for the session up until the current moment within the session and then updated as the session progresses. The knowledge subgraph is based upon the domain ontology related to the subject of the session. The knowledge subgraph may be compared against a knowledge base to identify one or more missing topics. The knowledge base is a trained model that provides an identification of topics or facets of topics that are related to a current or previously presented topic of the session.

The knowledge base is a domain specific curated base that is generated using a variety of inputs. For example, the knowledge base may be generated using knowledge subgraphs that were generated from sessions of related topics (e.g., a previous version of the product that is the subject of the current session, a parent subject of the current session subject, a subject having a similarity to or shared topic of the current session subject, etc.). The knowledge base may be generated using questions provided by users on a website, application, forum, or the like. For example, an Internet site may provide a written description of a product. As users read about the product, a user may provide a question or comment in a comment section of the website. As another example, a company may create a product page accessible via the intranet of the company. The product page may include a forum or section that allows provision of comments or questions by a user. The system may mine these information locations to capture the questions asked regarding the subject or topic. Other inputs for generating the knowledge base are possible and contemplated, for example, questions asked by participants of previous sessions, questions provided by the presenter, subjects and topics of written documents, and the like.

The knowledge subgraph of the current session can then be compared against at least a portion of the knowledge base, for example, a subgraph of the knowledge base, a document within the knowledge base, or the like. Based upon this comparison, the cognitive agent can identify which entities, topics, or facets of topics are missing from the current session. As an example, one subgraph within the knowledge base may identify that topics related to a smartphone include size, connectivity, and the ingress protection (IP) rating (this identifies the sealing effectiveness of enclosures to foreign bodies (e.g., dust, particulates, etc.)). Based upon a comparison of the knowledge subgraph of the current session to this subgraph of the knowledge base, the cognitive agent may identify that the session has discussed size and connectivity but not the IP rating of the smartphone. Thus, the cognitive agent may identify the IP rating as a missing or incomplete topic of the session.

Once one or more topics have been identified as incomplete, the cognitive agent may generate at least one question to be asked of the educator and relevant to the at least one incomplete topic at 103. Generating a question includes using a natural language generation technique that uses the incomplete topic to generate a question. The system may identify unstructured information from the knowledge base related to the incomplete topic and then convert this unstructured information to generate a natural language question using a natural language generation technique. Using the natural language generation technique on the identified incomplete topic ensures that the question is about a current topic in the session and not a question from the knowledge base itself. However, the question may be derived from the knowledge base. For example, the system may use a natural language generation technique to generate a question from the knowledge base. The system may then adapt the question, again using a natural language generation technique, to the current session using the knowledge subgraph of the current session.

The cognitive agent may identify a plurality of related questions for the incomplete topic. For example, the cognitive agent may identify "What is IP rating?," "What is the IP rating of this product?," and "Has the manufacturer done IP testing on this product?" as possible questions to be asked that are all related to the IP rating of the product of the current session. The cognitive agent may filter and prioritize the questions so that the session is not inundated with too many questions, particularly too many similar, irrelevant, or useless questions. Filtering the questions may include identifying questions that are not relevant to the current session. For example, if the current session is based upon a particular product, the question "What is IP rating?" may be irrelevant to this particular session and may be filtered from the plurality of questions.

The cognitive agent may also prioritize questions. Prioritizing questions may include identifying questions that are related to the domain of the session. Domain specific questions may then be given a higher priority than questions not related or having less relation to the domain. Prioritizing questions may also include identifying questions that have already been asked, for example, in previous sessions, in forums related to the subject of the session, or the like, and assigning a higher priority to these questions than questions that have not been previously asked. In other words, the cognitive agent may identify that users are interested in or have questions related to a particular topic, so questions related to that topic should be prioritized and asked. Prioritizing questions may also be based upon a level of generality associated with the question. For example, more general questions may be prioritized over more specific questions in an effort to provide some background information for the topic before asking the specific question. Other techniques for prioritizing questions are contemplated and possible.

At 104 the cognitive agent may identify a location within the learning session to ask the one or more generated questions, also referred to as an "ask-moment". The location within the learning session may be the moment where it is appropriate or acceptable for the cognitive agent to present the question to the presenter. To identify the location, the cognitive agent or system may use at least one natural language text classifier model. The natural language text classifier model can be used to identify a pause or break in the learning session. For example, a pause or break may be when the presenter stops speaking, ends a sentence, ends a topic, or the like. In other words, the classifier model can be used to detect natural breaks in the speech of the presenter and may identify these as possible locations for asking the generated question(s).

A natural language text classifier model may also be used to identify a topic change within the learning session. A topic change may be identified by identifying speech of the presenter that indicates a topic change is coming, for example, "now turning to the next topic," "that topic is complete," and the like. A topic change may also be identified based upon the presenter asking if anyone has any questions regarding a particular topic. Topic changes may also be identified using video or image information. For example, the system may use frame differencing to identify when a presentation has been changed from one slide to the next slide. This change to a new slide may represent a change in topics.

The system may then identify whether the ask-moment has been reached in the learning session at 105. If the ask-moment has not been reached, the system may wait for the ask-moment at 106. If, however, the ask-moment has been reached, the cognitive agent may provide an output, for example, an audio-based output, corresponding to the at least one question at the ask-moment within the learning session at 107. In the case of a live session, the questions generated by the system or cognitive agent are asked while the session is ongoing. In the case of a session that is being recorded for later access by a participant, the questions generated by the cognitive agent are asked while the session is being prepared. In other words, the questions generated by the cognitive agent are asked of the presenter at a time when the presenter can answer the question and the participants can benefit from the answer during the session.

As the questions are being provided at the identified ask-moment, or after the questions have been provided at the identified ask-moment, the system may receive feedback from the presenter regarding the quality of the question and the appropriateness of the identified ask-moment. For example, the presenter may provide feedback regarding whether the question was a good or appropriate question (e.g., "good question," the presenter providing the answer to the question, "that question is irrelevant," "that question is discussed in a different session," etc.). As another example, the presenter may provide feedback regarding whether the question was provided at the appropriate location within the learning session (e.g., "that is discussed later in this session," the presenter ignoring the question and continuing the current topic, "not now," etc.). The feedback may also be based upon the emotion of the presenter when responding to the question. For example, the system may then identify whether the presenter is annoyed, frustrated, happy, neutral, or the like, in relation to the asked question and timing of the question. The system may then classify the feedback. The classification may identify the feedback as positive, neutral, or negative regarding either the question, the timing of the question, or a combination thereof.

Using the provided feedback and the identified classification of the feedback, the cognitive agent may adjust the types of questions that are asked and the location of the ask-moments. In other words, the system may learn, based upon feedback provided by the presenter, what types of questions should be asked that will be relevant to the current session or a similar question and when the questions should be asked. The feedback may be used by the system to calculate a question relevancy score and/or an ask-moment score. Positive feedback may increase the question relevancy score and/or ask-moment score. Neutral feedback may make no changes to the score(s). Negative feedback may decrease the score(s). Additionally, feedback may have a positivity range which may affect the score(s) differently. For example, highly positive feedback may significantly increase the score(s), while slightly positive feedback may only slightly increase the score(s).

Based upon the score(s) the system may adjust the ask-moment and the questions asked. For example, if the ask-moment score reaches a particular threshold (either in the positive or negative direction) the ask-moment may be modified. Similarly, if the question relevancy score reaches a particular threshold (either in the positive or negative direction), the system may ask different questions or may access a different portion of the knowledge base for question generation.

Figure 2:
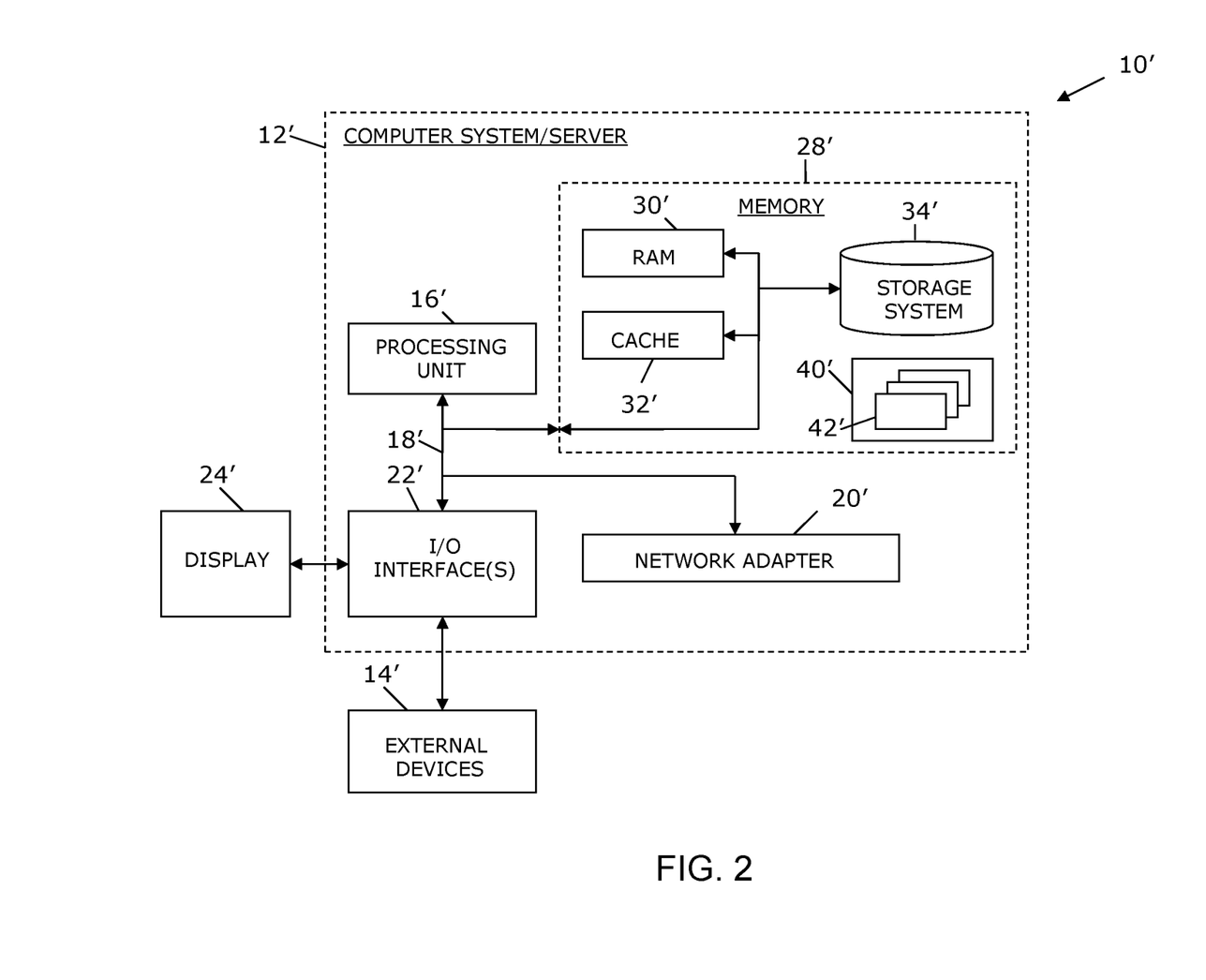
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving input of a multimedia learning session that is being conducted by an educator, the learning session being provided to at least one user and being related to a subject, wherein the subject is identified by accessing a schedule corresponding to the learning session and parsing the schedule to identify the subject;
determining, using a knowledge base, that at least one topic relevant to the subject of the learning session is incomplete, wherein the determining comprises building a knowledge subgraph of the learning session and comparing the built knowledge subgraph to at least a portion of the knowledge base, the knowledge subgraph comprising topics presented during the learning session, wherein the building a knowledge subgraph comprises identifying topics presented during the learning session as the learning session progresses, wherein identifying topics comprises (i) capturing audio of the learning session as the learning session progresses, converting, utilizing automatic speech recognition, to text, and parsing the text to identify words and topics included in the audio (ii) capturing images of the learning session as the learning session progresses, extracting, utilizing a frame differencing technique, frames from the images, and identifying topics from the frames, and (iii) determining topics related to the topics presented during the learning session by performing topic modeling on the topics identified from the audio and on the topics identified from the images;
generating at least one question to be asked of the educator relevant to the at least one incomplete topic;
identifying, using at least one natural language text classifier model, a location within the learning session to ask the generated at least one question; and
providing, to the educator, an output corresponding to the at least one question at the identified location within the learning session.

2. The method of claim 1, wherein the at least one incomplete topic comprises a topic that is not addressed in the learning session.

3. The method of claim 1, wherein the at least one incomplete topic comprises a topic that is mentioned but not fully addressed in the learning session.

4. The method of claim 1, comprising receiving input from the educator related to (i) a quality of the at least one question and (ii) an appropriateness of the identified location.

5. The method of claim 4, comprising learning (i) adjusted questions to ask and (ii) adjusted locations to ask the questions based upon the input received from the educator.

6. The method of claim 1, wherein the comparing comprising comparing the built knowledge subgraph to a curated knowledge graph of the knowledge base.

7. The method of claim 6, wherein the determining at least one incomplete topic comprises identifying a missing entity of the built knowledge subgraph when compared to the curated knowledge graph.

8. The method of claim 1, wherein the generating at least one question comprises using at least one natural language generation technique.

9. The method of claim 1, wherein the generating at least one question comprises generating a plurality of related questions and prioritizing the plurality of related questions to select a question to be asked.

10. The method of claim 1, wherein the identifying a location comprises using at least one natural language text classifier model to identify a topic change.

11. An apparatus, comprising:
at least one processor; and
a computer readable storage medium having computer readable program code embodied therewith and executable by the at least one processor, the computer readable program code comprising:
computer readable program code configured to receive input of a multimedia learning session that is being conducted by an educator, the learning session being provided to at least one user and being related to a subject, wherein the subject is identified by accessing a schedule corresponding to the learning session and parsing the schedule to identify the subject;
computer readable program code configured to determine, using a knowledge base, that at least one topic relevant to the subject of the learning session is incomplete, wherein the determining comprises building a knowledge subgraph of the learning session and comparing the built knowledge subgraph to at least a portion of the knowledge base, the knowledge subgraph comprising topics presented during the learning session, wherein the building a knowledge subgraph comprises identifying topics presented during the learning session as the learning session progresses, wherein identifying topics comprises (i) capturing audio of the learning session as the learning session progresses, converting, utilizing automatic speech recognition, to text, and parsing the text to identify words and topics included in the audio (ii) capturing images of the learning session as the learning session progresses, extracting, utilizing a frame differencing technique, frames from the images, and identifying topics from the frames, and (iii) determining topics related to the topics presented during the learning session by performing topic modeling on the topics identified from the audio and on the topics identified from the images;
computer readable program code configured to generate at least one question to be asked of the educator relevant to the at least one incomplete topic;
computer readable program code configured to identify, using at least one natural language text classifier model, a location within the learning session to ask the generated at least one question; and
computer readable program code configured to provide, to the educator, an output corresponding to the at least one question at the identified location within the learning session.

12. A computer program product, comprising:
a computer readable storage medium having computer readable program code embodied therewith, the computer readable program code executable by a processor and comprising:
computer readable program code configured to receive input of a multimedia learning session that is being conducted by an educator, the learning session being provided to at least one user and being related to a subject, wherein the subject is identified by accessing a schedule corresponding to the learning session and parsing the schedule to identify the subject;

computer readable program code configured to determine, using a knowledge base, that at least one topic relevant to the subject of the learning session is incomplete, wherein the determining comprises building a knowledge subgraph of the learning session and comparing the built knowledge subgraph to at least a portion of the knowledge base, the knowledge subgraph comprising topics presented during the learning session, wherein the building a knowledge subgraph comprises identifying topics presented during the learning session as the learning session progresses, wherein identifying topics comprises (i) capturing audio of the learning session as the learning session progresses, converting, utilizing automatic speech recognition, to text, and parsing the text to identify words and topics included in the audio (ii) capturing images of the learning session as the learning session progresses, extracting, utilizing a frame differencing technique, frames from the images, and identifying topics from the frames, and (iii) determining topics related to the topics presented during the learning session by performing topic modeling on the topics identified from the audio and on the topics identified from the images;

computer readable program code configured to generate at least one question to be asked of the educator relevant to the at least one incomplete topic;

computer readable program code configured to identify, using at least one natural language text classifier model, a location within the learning session to ask the generated at least one question; and computer readable program code configured to provide, to the educator, an output corresponding to the at least one question at the identified location within the learning session.

13. The computer program product of claim 12, wherein the at least one incomplete topic comprises at least one of: a topic that is not addressed in the learning session and a topic that is mentioned but not fully addressed in the learning session.

14. The computer program product of claim 12, comprising receiving input from the educator related to (i) a quality of the at least one question and (ii) an appropriateness of the identified location.

15. The computer program product of claim 14, comprising learning (i) adjusted questions to ask and (ii) adjusted locations to ask the questions based upon the input received from the educator.

16. The computer program product of claim 12, wherein the comparing comprises comparing the built knowledge subgraph to a curated knowledge graph of the knowledge base.

17. The computer program product of claim 16, wherein the determining at least one incomplete topic comprises identifying a missing entity of the built knowledge subgraph when compared to the curated knowledge graph.

18. The computer program product of claim 12, wherein the generating at least one question comprises generating a plurality of related questions and prioritizing the plurality of related questions to select a question to be asked.

19. The computer program product of claim 12, wherein the identifying a location comprises using at least one natural language text classifier model to identify a topic change.

20. A method, comprising:

utilizing at least one processor to execute computer code that performs the steps of:

receiving input of a multimedia training session being presented by at least one demonstrator, wherein the training session comprises a session for training at least one user regarding a topic, wherein the topic is identified by accessing a schedule corresponding to the training session and parsing the schedule to identify the topic;

identifying, within the training session, at least one skip-over sub-topic, wherein the at least one skip-over sub-topic comprises a sub-topic presented within the training session that is incomplete, wherein the identifying comprises identifying topics presented during the training session as the training session progresses, wherein identifying topics comprises (i) capturing audio of the training session as the training session progresses, converting, utilizing automatic speech recognition, to text, and parsing the text to identify words and topics included in the audio (ii) capturing images of the training session as the training session progresses, extracting, utilizing a frame differencing technique, frames from the images, and identifying topics from the frames, (iii) determining topics related to the topics presented during the training session by performing topic modeling on the topics identified from the audio and on the topics identified from the images, and (iv) determining a related topic is not presented during the training session;

generating, using a knowledge base related to the topic, a plurality of questions relevant to the skip-over sub-topic and prioritizing the plurality of questions based upon information provided in the training session;

detecting a suitable location within the training session to ask at least one of the plurality of questions; and providing output of the at least one of the plurality of questions at the detected location.

* * * * *